United States Patent [19] [11] 4,234,158
Rollins et al. [45] Nov. 18, 1980

[54] COMBINATION TANK CAR VALVE SKID AND VALVE SEAT WHEREIN THE SKID IS WELDED TO THE VALVE SEAT

[75] Inventors: Dallas W. Rollins; Gunter R. Behle, both of St. Charles; Charles E. Reedy, Bridgeton, all of Mo.

[73] Assignee: ACF Industries, Incorporated, New York, N.Y.

[21] Appl. No.: 57,870

[22] Filed: Jul. 16, 1979

Related U.S. Application Data

[62] Division of Ser. No. 860,987, Dec. 15, 1977, Pat. No. 4,184,663.

[51] Int. Cl.³ .......................... F16K 35/00; B61D 5/00
[52] U.S. Cl. .................................. 251/144; 137/350; 137/382.5
[58] Field of Search ................ 251/144; 105/358, 360, 105/362; 137/382, 382.5, 347, 348, 350

[56] References Cited

U.S. PATENT DOCUMENTS

| 928,924 | 7/1909 | Ames | 105/362 |
|---|---|---|---|
| 1,500,918 | 7/1924 | Bolton et al. | 251/155 X |
| 3,981,481 | 9/1976 | Reedy et al. | 137/544 |
| 4,121,614 | 10/1978 | Reedy | 137/382.5 |
| 4,158,453 | 6/1979 | Reedy | 137/74 |

Primary Examiner—William R. Cline
Attorney, Agent, or Firm—Henry W. Cummings

[57] ABSTRACT

In a bottom operable tank car lading valve assembly, a combination skid and lading valve seat for the lading valve closure is provided, which is attached to the tank car universal flange with mechanical fasteners. The valve seat portion extends inwardly and upwardly from the universal flange and includes a machined seat. The skid portion extends upwardly and outwardly from the universal flange, forming a circumferential taper, and the upper portion abuts the bottom of the tank. The outer end of the skid portion is connected to the tank with fasteners which do not require stress relieving of the tank body. The skid portion protects the lading valve closure and the lading valve seats against impacts which might normally cause unseating of the valve closure and escape of the lading in the absence of the skid portion.

8 Claims, 9 Drawing Figures

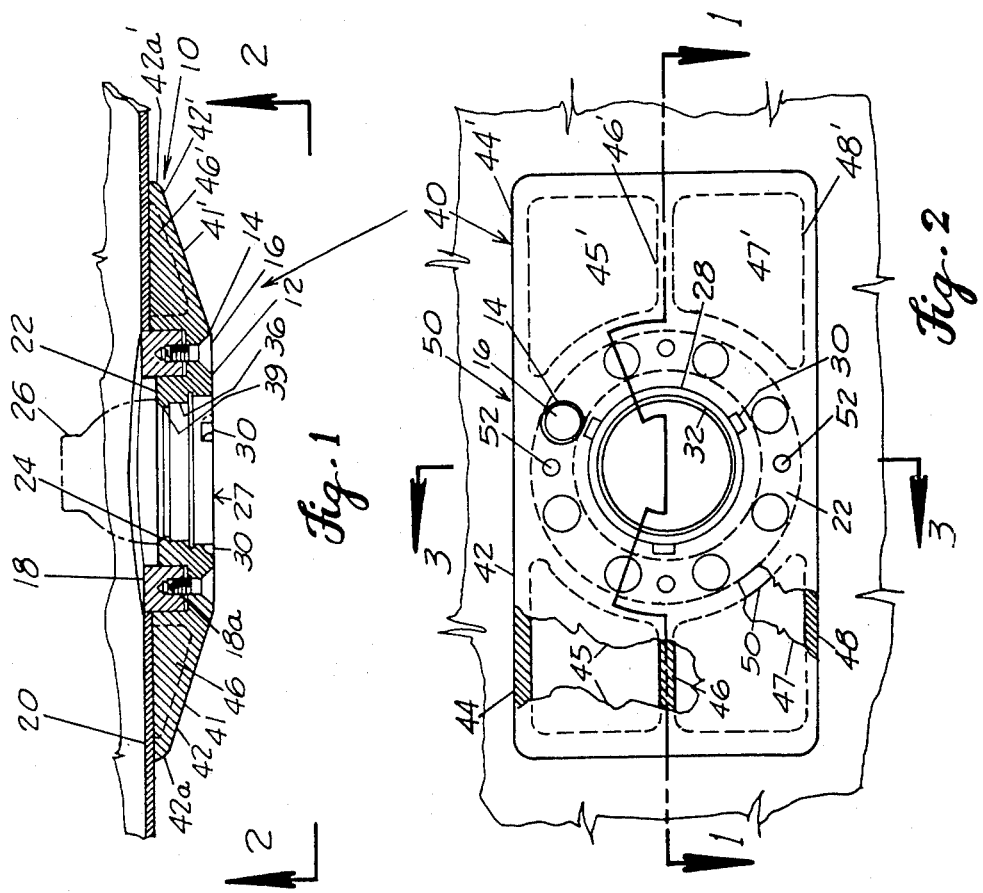

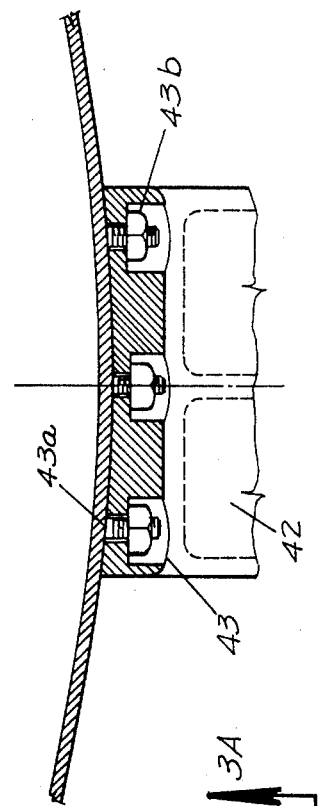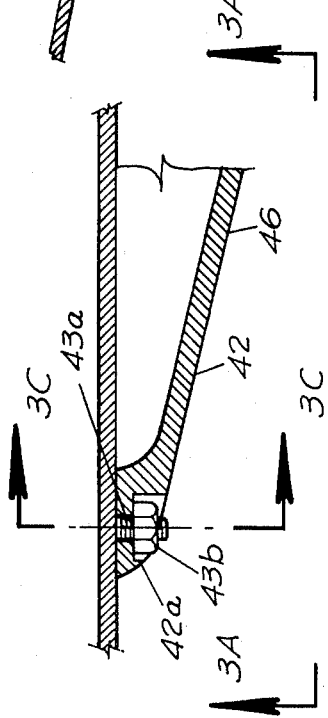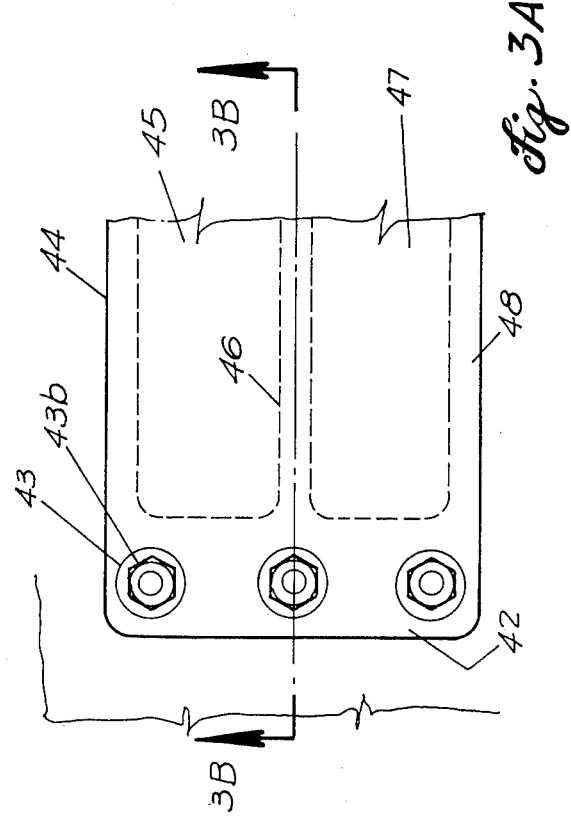

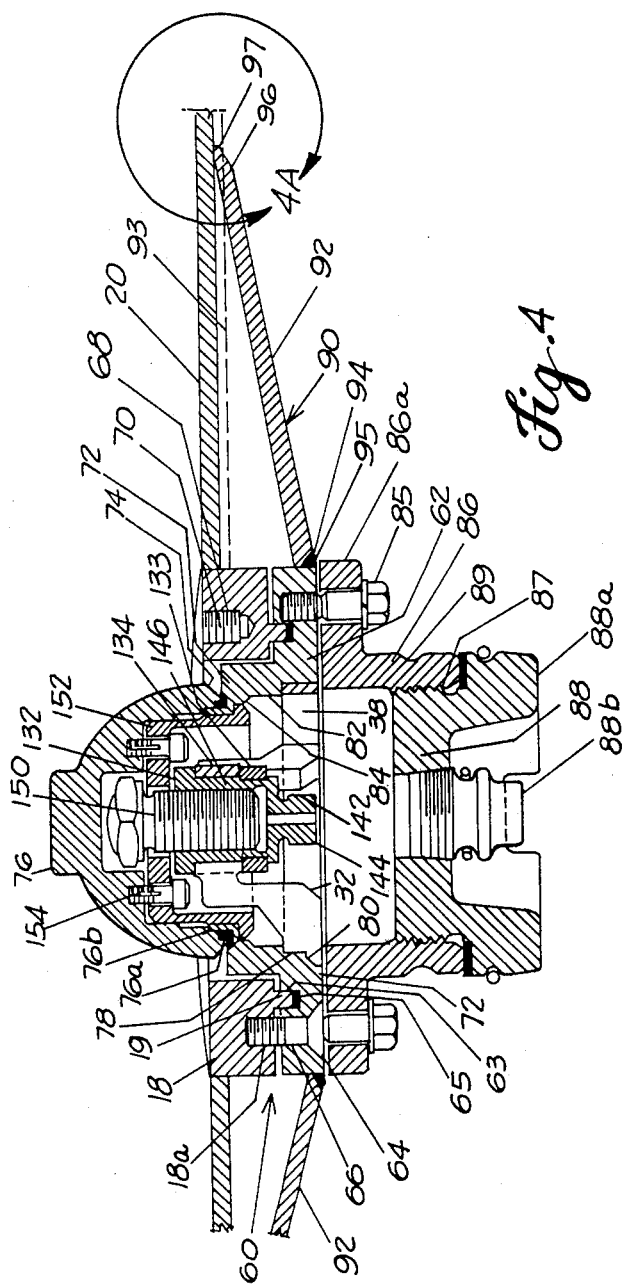

COMBINATION TANK CAR VALVE SKID AND VALVE SEAT WHEREIN THE SKID IS WELDED TO THE VALVE SEAT

This is a division of application Ser. No. 860,987, filed Dec. 15, 1977, now U.S. Pat. No. 4,184,663.

BACKGROUND OF THE INVENTION

Recent Associations of American Railroads (AAR) and Department of Transportation (DOT) railway tank car regulations for stub sill cars require that projections extending below the tank bottom in excess of one (1) inch must be portected by a skid. It is recommended that the skid have a three unit longitudinal dimension along the bottom of the tank for each one unit of downward projection from the bottom of the tank.

One proposed skid design comprises a conical shaped skid welded to the bottom of the tank, tapering downwardly from the tank bottom at a slope of 3:1 and having a center opening where the lading valve is located for unloading of the lading. However the skid is welded to the tank bottom outboard of the universal flange found on presently used tank cars. This is disadvantageous because the weld to the tank bottom requires stress relieving, and the skid adds weight to the car with no functional benefit to the car other than outlet valve protection.

In U.S. Pat. No. 928,924 (1909) a tank car is disclosed in which castings C and D are mounted in the through center sill A and part of the casting C serves as a valve seat for the lading valve E. Casting C is tapered downwardly and outwardly away from the lading valve toward castings D. The through center sill and castings C and D would inherently provide some protection for the lading valve seat and lading valve closure.

However the through center sill design adds weight to the car in constrast to a stub sill tank car, and the taper on the castings C tends to direct obstructions into the lading valve seat and valve closure, rather than away from the valve seat and valve closure.

SUMMARY OF THE INVENTION

The object of the present invention is to provide a tank car combination valve seat and skid design for stub sill cars which complies with the above AAR and DOT Regulations, which can be readily attached to existing stub sill tank cars without welding to the tank bottom and which adds little weight to the car.

In a bottom operable tank car lading valve assembly, a combination skid and lading valve seat for the lading valve closure is provided, which is attached to the tank car universal flange with mechanical fasteners. The valve seat portion extends inwardly and upwardly from the universal flange and includes a machined seat for the valve closure. The skid portion extends upwardly and outwardly from the universal flange, forming a circumferential taper, and the upper portion abuts the bottom of the tank. Fasteners connect the upper portion to the tank bottom which do not require stress relieving of the tank. The skid portion protects the lading valve closure and the lading valve seat against impacts which might normally cause unseating of the valve closure and escape of the lading in the absence of the skid portion. The valve seat portion may include additional machined surfaces which are required for the raising and lowering of the valve closure. The valve seat portion, body portion and skid portion may be formed from a single member, or the skid portion may be welded to an integral valve seat portion and body portion. The skid portion preferably includes longitudinally extending webs separated by void spaces to save weight. A depending lading valve housing including a lading outlet may be attached to the combination valve seat and skid with fasteners which constitute a shear plane for the valve housing. The housing may include a lower operator for the valve closure. Alternatively the valve closure may be top operated. In another alternative fastener constituting a shear plane may be used to attach a valve guard which protects the valve closure in transit and to which an adapter having a lower operator to operate the valve closure may be attached at destination for loading and unloading the lading.

THE DRAWINGS

FIG. 1 is a vertical sectional view illustrating the combination skid and valve seat of the present invention, looking in the direction of the arrows along the line 1—1 in FIG. 2;

FIG. 2 is a bottom view looking in the direction of the arrows along the line 2—2 in FIG. 1;

FIG. 3 is a vertical sectional view looking in the direction of the arrows along the line 3—3 in FIG. 2;

FIG. 3A is a partial bottom view of a modification of the arrangement shown in FIGS. 1-3;

FIG. 3B is a partial vertical sectional view looking in the direction of the arrows along the line 3B—3B in FIG. 3A;

FIG. 3C is a partial vertical sectional view looking in the direction of the arrows along the line 3C—3C in FIG. 3B;

FIG. 4 is a partial vertical sectional view illustrating an alternative embodiment of the combination skid and valve seat of the present invention;

FIG. 4A is an enlarged vertical sectional view illustrating still another embodiment;

DESCRIPTION OF PREFERRED EMBODIMENTS

Figure 5:
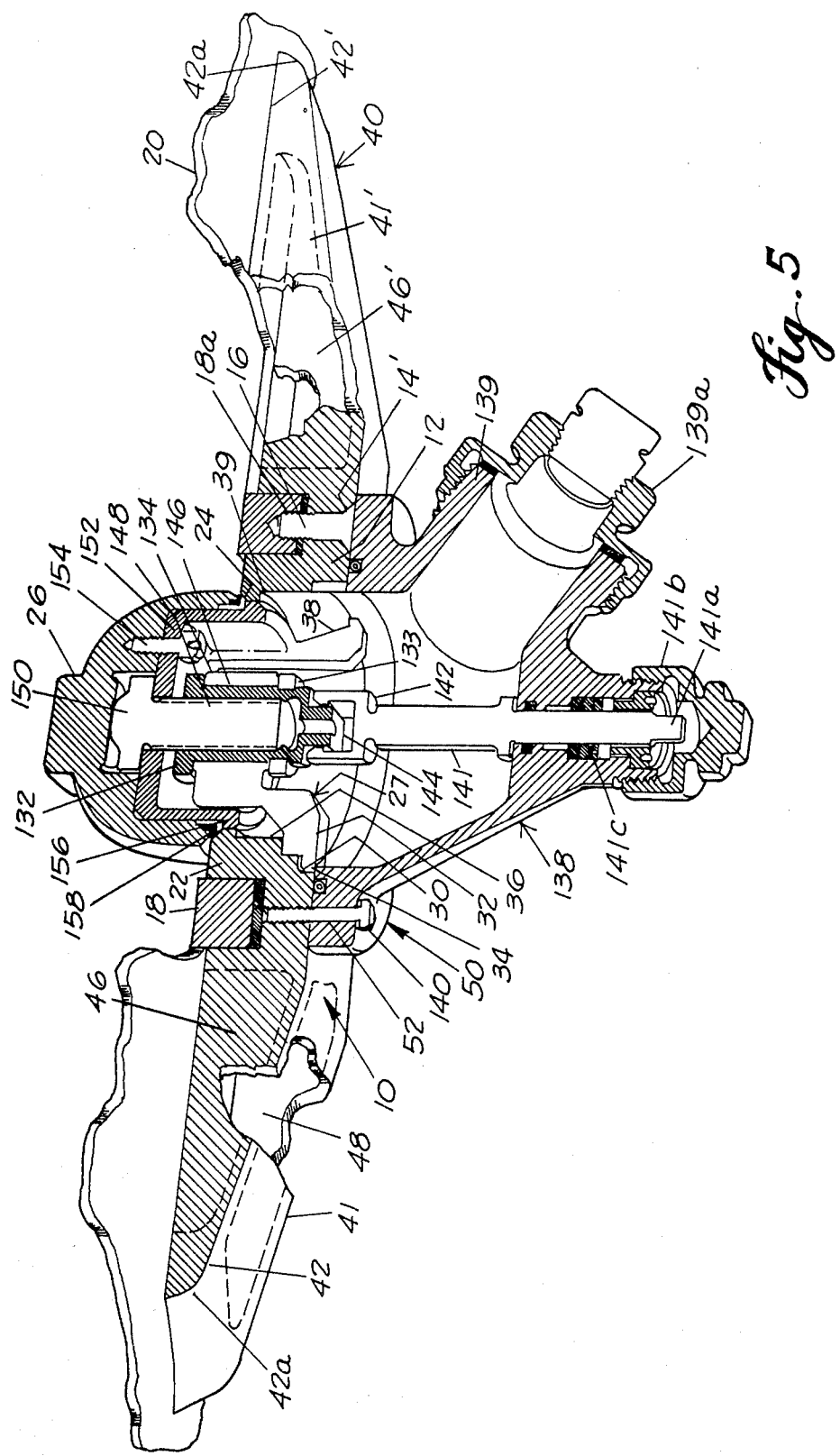
FIG. 5 is a perspective view, partly in section, illustrating a depending outlet housing attached to the combination skid and valve seat of the present invention, in which the housing includes a lower operator for raising and lowering the valve closure.

In accordance with the present invention a combination skid and valve seat is indicated in the drawings generally at 10. The combination skid and valve seat includes a generally cylindrical body portion 12 having openings therein 14 which are countersunk. Bolts 16 attach the combination skid and valve seat to a circular universal tank car flange 18 having drilled, threaded openings 18a. The universal flange 18 is welded to the tank bottom 20 in the usual manner.

The combination skid and valve seat includes a valve seat portion 22 which extends inwardly and upwardly from body portion 12 within universal flange 18. The valve seat portion 22 includes a machined valve seat 24 which is tapered inwardly upon which a valve closure 26 seats in closed position to maintain lading within the tank.

The design of the particular valve closure is not a part of the present invention except that the valve closure and the valve seat 24 must be compatible to provide a seal to maintain the lading in the tank. The valve closure may be operated from the top of the tank or from the bottom of the tank. A top operated valve closure is disclosed in the aforementioned U.S. Pat. No. 928,924. Many other top operated valve closure designs exist in the patent art and/or which are commercially available.

A bottom operated valve closure is disclosed in U.S. Pats. Nos. 3,981,481; 4,141,535 and 4,124,193, assigned to the same assignee as the present application. An improved design is found in U.S. Pat. No. 4,158,453, also assigned to the same assignee as the present application U.S. Pat. No. 3,981,481 and the foregoing patent applications are hereby incorporated into the present application by this reference. The valve closure in these arrangements can be removed with lading in the tank for repair or replacement as described in U.S. Pat. No. 4,161,958, hereby incorporated into the present application by this reference.

This valve seat portion 22 may require additional machined surfaces to accomodate an operator 27 for the particular closure member. For example, if the aforementioned valve closure described in U.S. Pat. No. 4,158,453 is utilized, a lower vertical machined surface 28 is provided including a plurality of spaced slots 30 for the attachment of a valve closure retainer 32 (FIG. 5) having projections 34. Furthermore a circumferential guide surface 36 is provided to guide vertical movement of a depending portion 38 of the valve closure as the valve closure moves between open and closed position. A stop 39 is provided to cease vertical movement of the valve closure 26 when it has assumed the full open position. It is to be emphasized, however, that the particular machined surfaces to be provided on the valve seat portion will depend upon the construction of the particular valve closure and valve operator utilized. Thus the additional machined surfaces described and illustrated are by way of example only, and should not be considered as limiting.

The combination skid and valve seat further includes a skid portion indicated in the drawings generally at 40. The skid portion extends upwardly and outwardly from the body portion 12 on opposite sides as indicated at 41 and 41'. The end portions 42, 42' abut the bottom of the tank 20. While it is possible to construct the skid portion 40 of a large solid member, it is preferred to use the web construction illustrated in FIGS. 2 and 3 to save weight. This web construction includes webs 44, 46, 48 and 44', 46', 48' located respectively on opposite sides of the valve seat portion 22. Between webs 44, 46 and 44', 46' are respective voids 45 and 45'. Similarly between webs 46, 48 and 46', 48' respective voids 47 and 47' exist. Webs 44, 46, 48 and 44', 46', 48' terminate in skid end portions 42 and 42' adjacent the bottom of tank 20. End portions 42 and 42' are curved as indicated at 42a and 42a' to avoid a projecting surface. The curved end portions 42a and 42a' preferably do not extend more than one (1) inch to meet AAR and DOT requirements for vertical projections below the tank bottom.

Skid portions 41, 41' are preferably constructed with a 3:1 longitudinal to vertical slope to comply with the above described AAR and DOT Regulations. It will be noted, however, that the skid end portions 42 and 42' merely abut the bottom of the tank. They are not welded thereto and thus stress relieving of the tank is not required. Curved end portions 42a and 42a' and the taper of the skid reduce the liklihood that if the tank or the combination skid and valve seat is impacted, the portion of the impact loads transmitted to valve seat 24 and valve closure 26 will be of sufficient magnitude to cause unseating of valve closure 26 and escape of the lading.

It is a simple operation to attach the combination skid and valve seat to existing tank bottoms. All that is necessary is to drill the threaded openings 18a into the universal flange 18, if the holes are not already in the flanges. The combination skid and valve seat can then be attached to the universal flange by inserting fasteners 16 into countersunk openings 14 in the combination skid and valve seat.

As shown in FIGS. 3A–3C in an alternative construction, openings 43 may be provided in end portions 42, 42' and threaded studs 43a welded to the tank bottom. Fastening nuts 43b may then be attached to hold the skid portion in engagement with the tank bottom 20.

Body portion 12 further includes connecting means indicated generally at 50 (FIGS. 2 and 5) for attaching to the combination skid and valve seat to a depending member including a lading outlet which may include a bottom operator for the valve closure. The connecting means 50 may include a plurality of openings 52 (FIG. 2) located around the same bolt circle as openings 14 but circumferentially spaced therefrom. Four are illustrated in FIG. 2. Openings 52 may be used to attach a depending housing 138 or outlet chamber shown in FIG. 5. Openings may also be utilized to connect the combination skid and valve seat to a valve guard as described in Reedy U.S. Pat. No. 4,121,614, which protects the valve closure in transit and wherein an adapter is attached at destination to load and unload the lading. A suitable adapter is described in Reedy U.S. Pat. No. 4,137,937. U.S. Pat. Nos. 4,121,614 and 4,137,937 are assigned to the same assignee as the present application and are hereby incorporated into the present application by this reference. An example of the depending housing 138 containing a bottom operator for closure member 26 will be described hereinafter.

Another embodiment of the present invention is illustrated in FIG. 4. In this embodiment a combination skid and valve seat 60 includes a generally circular body portion 62 having countersunk openings 64 into which fasteners 66 are inserted to attach the combination skid and valve seat to a universal flange 18 attached to a tank bottom 20 by welding, and having threaded openings 18a. FIG. 4 also illustrates a tongue 19 on universal flange 18. Body portion 62 includes a circular slot 63 into which is inserted a gasket seal 65. FIG. 4 illustrates that for retrofit, openings 68 in the universal flange may be filled with fillers 70 as part of a retrofit operation.

The combination skid and valve seat 60 includes a valve seat portion 72 which extends upwardly and inwardly from body portion 62 within universal flange 18. A machined valve seat 74 is provided upon which seats a valve closure 76 in closed position. As described above machined surfaces 78, 80, 82 and shoulder 84 may be provided as are necessary for the operation of the particular valve closure utilized, and described in greater detail hereinafter relative to FIG. 5.

In this embodiment fasteners 85, constituting a shear plane, are shown holding in place a depending valve guard 86 including a flange portion 86a and an internally threaded portion 87 into which is inserted a transverse plug 88 having a protective protrusion 88a. A removable plug 88b is also provided as described in detail in said U.S. Pat. No. 4,121,614. A connecting seat or contour 89 is also provided to receive an adapter (not shown) constructed according to the teachings of U.S. Pat. No. 4,137,937.

However it is to be understood that fasteners 85 may also be used to attach a depending housing 138 (FIG. 5) including a lading outlet 139 and a bottom operator 141.

Also in this embodiment the skid portion 90 comprises a circular plate 92 which is curved as indicated in dotted lines at 93 to follow the tank curvature, attached to body portion 62 with a weld 94. As described in the embodiment shown in FIGS. 1 through 3, plate 92 is preferably of a length to provide the 3:1 longitudinal to vertical slope required by the AAR and DOT. Weld 94 is preferably a fillet weld and in which plate 92 is cut away at 95 to facilitate making this fillet weld.

The end portion 96 of circular plate 92 is preferably curved at 97 and abuts the tank bottom. Preferably curved end portion 97 does not extend more than one (1) inch below the tank bottom to meet AAR and DOT requirements.

This embodiment has the advantage that existing flange and valve seat members of the type described in U.S. Pat. No. 4,158,453 referred to above can be provided with a skid by merely welding in place a curved plate 92. Thus existing tank cars having the bottom operable closure disclosed in U.S. Pat. No. 4,158,453 can be readily retrofitted by attaching plate 92 to provide a skid portion and comply with the AAR and DOT regulations.

An alternative arrangement is shown in FIG. 4A. A plate 100 may be welded to the tank bottom 20 and universal flange 18 at 100a, and at 100b prior to welding in place the plate 92'. Then plate 92' may be welded at 94' to a body portion 62 and to plate 100. Weld metal 102 may then be utilized to provide a curved tapered portion 104 so that impact loads will be directed downwardly along plate 92' rather than upwardly into the valve seat portion to cause unseating of the valve closure, or upwardly into the tank, and increasing the liklihood of puncturing the tank. This construction does require stress relieving of the tank where plate 100 is welded to the tank. Furthermore after initial assembly, valve closure 76, seat 76a and keeper 76b must be removed from inside the tank. The remaining parts can be removed from outside the tank as described in U.S. Pat. No. 4,161,958 referred to above.

FIG. 5 illustrates a lading valve assembly including the combination valve seat and skid of the present invention with a depending housing 138 attached to the combination skid and valve seat body portion 12. Depending housing 138 is attached to body portion 12 with fasteners 140. Fasteners 140 extend into openings 52 located between fasteners 16 (FIG. 2). Fasteners 140 constitute a shear plane whereby housing 138 will shear off upon impact. Housing 138 includes a lading outlet 139 having a cap 139a and a depending operator 141 having a lower tool connection portion 141a a cap 141b, seals 141c and an upper portion 142 which engages a cooperating portion 144 of operator 27. Upper operator 27 is maintained in position, spaced from the walls of the valve seat portion 22, by retainer 32 which engages the machined surfaces 28 and 30 described above. Note projections 34 of retainer 32. Retainer 32 engages at 134 a shoulder 132 and a split collar 133 on operator 146. Operator 146 is internally threaded at 148 and a depending operator 150 is externally threaded. Operator 150 is held in place by means of a depending member 152 held in place engaging closure 26 by fasteners 154. Depending member 152 includes a portion 156 that maintains a seal 158 in place. In closed position seal 158 seats on valve seat 24. Details of the closure and seal arrangement are described in U.S. Pat. No. 4,158,453 referred to above.

With housing 138 in plane, caps 139a and 141b may be removed and a suitable tool attached to the lower portion 141a of operator 141 to rotate operator 141. This in turn rotates operator 144. Depending member 152 includes arms 38 which engage retainer ribs 32 after initial rotation of operator 146. After engagement of arms 38 and retainer 32 the closure member 26 is movable vertically to the open position. Rotation in the opposite direction lowers it to the closed, seated position on valve seat 24.

As mentioned above, fasteners 140 constitute a shear plane. If housing 138 is impacted, the fasteners will shear off and the housing and the operator 141 will drop off. Note clearance between members 142 and 144. Thus closure member 26 will remain in the closed, seated position even if housing 138 is impacted and is sheared off.

If skid portion 40 is impacted, the vertical impact loads tend to be directed into the massive tank body, with little tendency to unseat valve closure 26. Horizontal components are directed into universal flange 18 which tends to protect valve seat portions 22 and 72 (FIG. 4) from these horizontal impact loads.

If the tank has become unsaddled from its truck, for example in derailment, and the tank is skidding along the ground, the skid tends to keep the tank moving and avoids impact loads which might result from the universal flange, without a skid, abutting a solid, rigid object in its path. The depending housing 138 or valve guard 86 (FIG. 4) may be sheared off as the tank skids along, but the liklihood that the valve closure will become unseated is significantly reduced with the combination skid and valve seat of the present invention.

The embodiments shown in FIGS. 4 and 4A function in a similar manner.

It will thus be apparent that the combination skid and valve seat of the present invention is readily attached to the existing universal flange of the tank car by mechanical fasteners, and in FIGS. 4 and 4A by welding. The skid slope may be fabricated to comply with the 3:1 longitudinal/vertical projection ratio required by current AAR and DOT Regulations. In the embodiment shown in FIGS. 1-3 and 5 no welding is required to the tank body, thus avoiding stress relieving.

Providing weld metal 100b in the embodiment shown in FIG. 4A necessitates local stress relieving. However for some applications, such stress relieving may be preferred in a retrofit operation to provide skids on existing tank cars which comply with AAR and DOT requirements.

What is claimed is:

1. In a bottom operable tank car lading valve assembly a combination skid and lading valve seat for a lading valve closure comprising:

a generally annular body portion having fastening means for attaching the combination skid and valve seat to a tank car universal flange; a generally cylindrical portion extending inwardly and upwardly from said body portion having an opening for lading flow therethrough and including a valve seat for a valve closure; a skid portion welded to said body portion extending longitudinally outwardly from said body portion and abutting the tank bottom at the end portion thereof; the vertical extent of said skid portion decreasing as said skid portion extends outwardly from said universal flange to define a tapered lower skid portion, said fastening means maintaining said skid portion secured in a protective relation without attachment of said skid portion directly to the tank bottom; whereby said skid portion protects said lading valve seat against impacts which might normally cause unseating of the valve closure and escape of the lading in the absence of the skid portion.

2. A combination skid and valve seat according to claim 1 wherein said skid portion includes an upper surface which is curved where it abuts the tank bottom to follow the contour of the tank.

3. In a bottom operable tank car lading valve assembly a combination skid and lading valve seat for a lading valve closure comprising:

a generally annular body portion having fastening means for attaching the combination skid and valve seat to a tank car universal flange; a generally cylindrical portion extending inwardly and upwardly from said body portion having an opening for lading flow therethrough and including a valve seat for a valve closure; a skid portion welded to said body portion and extending outwardly from said body portion and abutting the tank bottom at its end portion; said skid portion including an upper surface which is curved where it abuts the tank bottom to follow the contour of the tank; said skid portion being welded to the tank body at its end portion; the vertical extent of said skid portion decreasing as said skid portion extends outwardly from said universal flange to define a tapered lower surface; whereby said skid portion protects said lading valve closure and said lading valve seat against impacts which might normally cause unseating of the valve closure and escape of the lading in the absence of the skid portion.

4. In a bottom operable tank car lading valve assembly a combination skid and lading valve seat for a lading valve closure comprising:

a generally annular body portion having first fastening means for attaching the combination skid and valve seat to a tank car universal flange; a generally cylindrical portion extending inwardly and upwardly from said body portion having an opening for lading flow therethrough, and including a valve seat for a valve closure; a valve closure movable between open and closed positions relative to said seat; a first skid portion integrally connected to said universal flange and extending outwardly from said universal flange and abutting the tank bottom at least at transversely spaced side portions and welded to said tank bottom at its end portion; a second skid portion rigidly connected to said body portion and extending longitudinally outwardly from said body portion and abutting said first skid portion at its end portion; the vertical extend of said second skid portion decreasing as said skid portion extends outwardly from said body portion to define a tapered lower surface; said second skid portion being rigidly attached to said first skid portion at the outer end of said second skid portion; whereby said first and second skid portions protect said lading valve closure and said lading valve seat against impacts which might normally cause unseating of the valve closure and escape of the lading in the absence of the skid portion.

5. A bottom operable lading valve assembly according to claim 4 including second fastening means attaching a depending outlet chamber to said body portion and valve seat portion; said outlet chamber being hollow and including at least one unloading spout for lading discharge; said second fastening means being shearable upon impact to said outlet chamber whereby said valve seat and said valve closure will remain in place during and after such impact, preventing the escape of lading.

6. A bottom operable lading valve assembly according to claim 5 wherein said first fastening means and said second fastening means are located on the same bolt circle.

7. A bottom operable lading valve assembly according to claim 4 wherein said first skid portion is welded to said universal flange.

8. A bottom operable lading valve assembly according to claim 7 wherein said second skid portion has an outer end which is welded to said first skid portion.

* * * * *